United States Patent
Gov-Ari

(10) Patent No.: US 10,376,104 B2
(45) Date of Patent: Aug. 13, 2019

(54) CUTTING BOARD

(71) Applicant: Shmouel Gov-Ari, Riverside, CT (US)

(72) Inventor: Shmouel Gov-Ari, Riverside, CT (US)

( * ) Notice: Subject to any disclaimer, the term of this patent is extended or adjusted under 35 U.S.C. 154(b) by 107 days.

(21) Appl. No.: 15/659,932

(22) Filed: Jul. 26, 2017

(65) Prior Publication Data

US 2018/0049596 A1 Feb. 22, 2018

Related U.S. Application Data

(60) Provisional application No. 62/375,527, filed on Aug. 16, 2016.

(51) Int. Cl.
*A47J 47/00* (2006.01)

(52) U.S. Cl.
CPC .................................... *A47J 47/005* (2013.01)

(58) Field of Classification Search
CPC ......... A47J 47/005; B65F 1/16; B65F 1/1607; B65F 2001/1653
See application file for complete search history.

(56) References Cited

U.S. PATENT DOCUMENTS

| | | | | |
|---|---|---|---|---|
| 2,679,945 A | * | 6/1954 | Cahill | A61G 7/0503 220/480 |
| 4,041,964 A | * | 8/1977 | Shamoon | A47J 47/005 108/26 |
| 4,077,685 A | * | 3/1978 | Scire | A47B 77/16 312/211 |
| 6,371,470 B1 | * | 4/2002 | Ward | A47J 47/005 269/13 |
| 8,360,407 B2 | | 1/2013 | Kent | |
| D684,022 S | | 6/2013 | Kim | |
| 8,800,984 B2 | | 8/2014 | Constantino | |
| 8,925,153 B1 | * | 1/2015 | McGrath | E05D 11/1007 16/326 |
| 2003/0218290 A1 | * | 11/2003 | Goldberg | B65F 1/10 269/289 R |
| 2005/0039607 A1 | * | 2/2005 | Comfield | A47J 47/005 99/324 |
| 2007/0001359 A1 | * | 1/2007 | Pearl | A47J 47/005 269/289 R |
| 2008/0149552 A1 | * | 6/2008 | Murphy | A47J 43/24 210/251 |
| 2008/0296823 A1 | * | 12/2008 | Pourounidis | A47J 47/005 269/289 R |
| 2009/0250860 A1 | * | 10/2009 | Hsu | A47J 47/005 269/309 |
| 2014/0027966 A1 | * | 1/2014 | Constantino, Jr. | A47J 47/005 269/15 |
| 2014/0252709 A1 | * | 9/2014 | Crimmins | A47J 47/005 269/14 |

* cited by examiner

*Primary Examiner* — Tyrone V Hall, Jr.
(74) *Attorney, Agent, or Firm* — Kirschtein, Israel, Schiffmiller & Pieroni, P.C.

(57) ABSTRACT

A portable cutting board has a reversible panel mounted with clearance in an opening of a frame for turning movement about a pivot axis between first and second cutting positions. Opposite panel surfaces of the panel are coplanar with opposite sides of the board in each cutting position. The panel is movable to a plurality of tilted positions between the first and second cutting positions. The opposite panel surfaces are tilted in each tilted position.

10 Claims, 3 Drawing Sheets

CUTTING BOARD

FIELD OF THE DISCLOSURE

The present disclosure relates generally to a cutting board and like food preparation devices.

BACKGROUND

A cutting board is a food preparation device that provides a flat work surface on which various types of foods are cut, sliced, diced, chopped, and otherwise processed by a food preparer to a desired size, shape, and consistency. The cutting board protects a countertop or like support surface on which it is placed from damage during this processing.

To avoid food contamination (cross-contamination), food-borne diseases, and taste alteration between certain types of food, such as fish, beef, pork, and poultry, on the one hand, that contain bacteria (e.g., *salmonella*, *listeria*, and *escherichia coli*), and other types of food, such as vegetables and fruits, on the other hand, it is known for the food preparer to use at least two cutting boards for the different types of food. However, purchasing and storing multiple cutting boards is burdensome, and there may not be any available space on the countertop to accommodate such multiple cutting boards. It is also known to configure a cutting board to be reversible, such that one work surface at one side of the board is used for processing one food type, and another work surface at the opposite side of the board is used for processing a different food type. However, some food preparers may forget which work surface is intended to be used for processing a particular food type, and as a result, cross-contamination may occur. The most common technique to avoid cross-contamination is simply for the food preparer to wipe off and clean the cutting board between uses for the different food types. The work surface of a cutting board can be rinsed or washed, preferably with soap, either by hand or by placing the board inside a dishwasher for cleaning. Yet, this takes time and care, and some food preparers may forget or only do a cursory cleaning, thereby compromising food safety.

Once the food is processed on a cutting board, there is typically waste or scraps that must be delivered to a waste disposal bin, and, of course, there is the processed food that must be delivered to a pot, a pan, a plate, or like kitchen equipment for eating and/or cooking. Typically, such deliveries are implemented, either by using a scraper or like utensil in which the waste/processed food is scraped off the board in multiple batches and hand-carried to the delivery site, or by picking up and hand-carrying the entire board to the delivery site at which the waste/processed food is removed from the board. Experience has shown, however, that such deliveries are sometimes accompanied by the waste/processed food falling accidentally off the board to the floor, which is not only messy and wasteful, but also unsanitary.

Accordingly, it would be desirable to provide an improved cutting board that reliably avoids food contamination, that allows a food preparer to easily and readily dispose of waste, that allows the food preparer to easily and readily remove processed food from the board, and that is readily cleanable.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
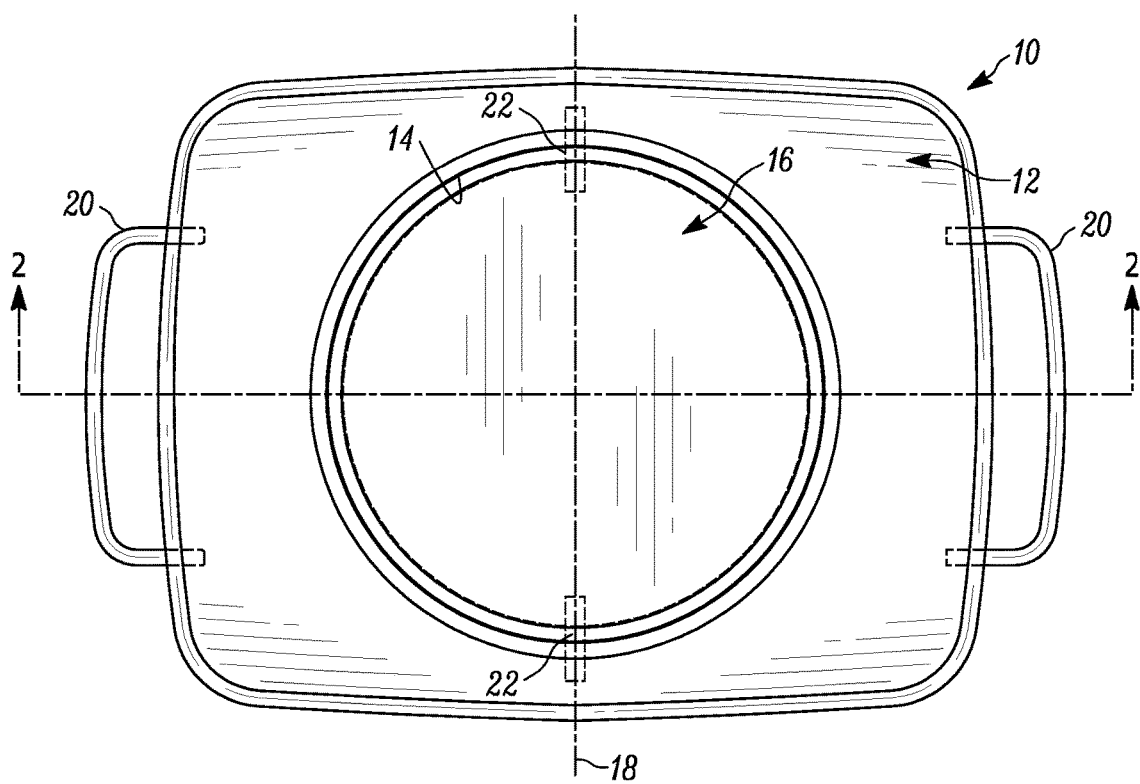
FIG. 1 is top plan view of one embodiment of a cutting board with a panel positioned in a cutting position in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The structural components of the cutting board have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In accordance with one feature of this invention, a portable cutting board includes a frame having a generally planar, upper frame surface lying in a top board plane, and a generally planar, lower frame surface lying in a bottom board plane that is generally parallel to the top board plane. An opening extends through the frame between the upper and lower frame surfaces along an upright direction that is generally perpendicular to the top and bottom board planes. The board also includes a reversible panel mounted with clearance in the opening for turning movement about a pivot axis that is transverse to the upright direction between a first cutting position and a second cutting position. Preferably, the first and second cutting positions are angularly spaced apart by 180 degrees about the pivot axis. The panel has a generally planar, upper panel surface that lies in the top board plane in the first cutting position and in the bottom board plane in the second cutting position, and a generally planar, lower panel surface that lies in the bottom board plane in the first cutting position and in the top board plane in the second cutting position. The panel is movable to a plurality of tilted positions between the first and second cutting positions. The upper and lower panel surfaces are tilted relative to the top and bottom board planes in each tilted position.

A pair of collinear shafts extends along the pivot axis in opposite directions away from the panel to the frame. The panel is turnable about the shafts. The panel is movable to the plurality of tilted positions in either circumferential direction about the pivot axis. The panel at least temporarily maintains each tilted position by friction. Advantageously, the panel and the opening are of complementary contour. The frame is preferably elongated and extends between opposite end regions, and a pair of handles is optionally mounted at the end regions, preferably by being press-fitted into bores formed in the frame. Advantageously, the frame and the panel are constituted of cleanable, lightweight materials.

Turning now to FIG. 1 of the drawings, reference numeral 10 generally identifies one embodiment of a portable cutting board having a frame 12 that is formed with an opening 14 in which a reversible panel 16 is mounted with mechanical clearance for turning movement in either circumferential direction about a pivot axis 18. Although the frame 12 in FIG. 1 is depicted as being generally rectangular in shape with rounded corners and rounded edges, it may have any shape, e.g., oval or circular with or without straight edges, or polygonal with or without sharp corners and/or straight edges. For example, see the preferred embodiment of FIG. 5. The frame 12 is preferably elongated and extends between opposite end regions at which a pair of handles 20 is optionally mounted. Although the opening 14 and the reversible panel 16 are each depicted as being generally circular in shape, each may have any shape, e.g., oval or polygonal. Preferably, the opening 14 and the reversible panel 16 have the same complementary contour. Although the opening 14 and the reversible panel 16 are depicted as being centrally located in the frame 12, this need not be the case since they may be offset toward one end region of the frame 12. Although a single opening 14 and a single reversible panel 16 are depicted, it will be understood that a plurality of openings/panels may be provided on the frame 12. The frame 12, as well as the reversible panel 16, are each substantially planar and may each be formed from any suitable material, such as wood, or a plastic, such as polyethylene. Such materials are relatively lightweight and readily cleanable.

Figure 2:
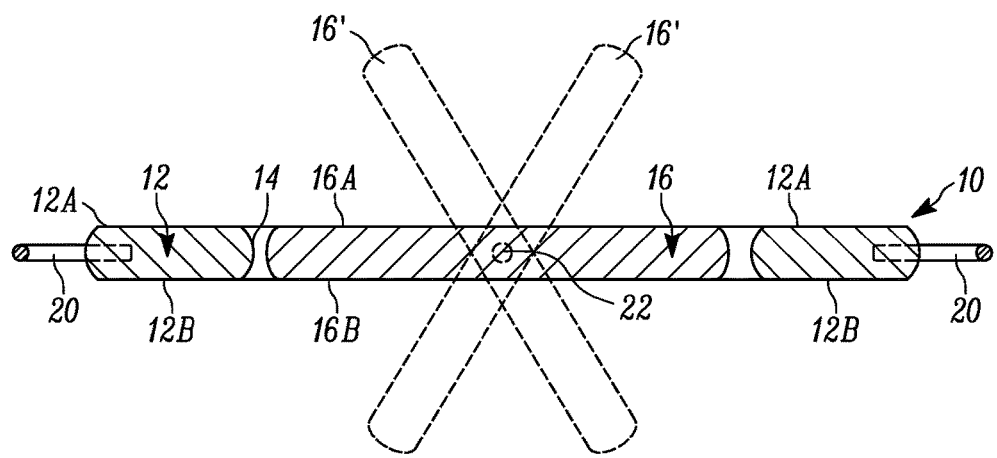
FIG. 2 is a sectional view taken on line 2-2 of FIG. 1, together with the panel depicted by phantom lines in tilted positions.

As shown in FIG. 2, the frame 12 has a generally planar, upper frame surface 12A lying in a top board plane, and a generally planar, lower frame surface 12B lying in a bottom board plane that is generally parallel to the top board plane. The opening 14 extends entirely through the frame 12 between the upper and lower frame surfaces 12A, 12B along an upright or vertical direction that is generally perpendicular to the top and bottom board planes. The panel 16 has a generally planar, upper panel surface 16A and a generally planar, lower panel surface 16B.

As described above, the reversible panel 16 is mounted in the opening 14 for turning movement about the pivot axis 18. A pair of collinear shafts 22 extends along the pivot axis 18 in opposite directions away from the panel 16 into the frame 12. In the embodiment of FIG. 1, the shafts 22 are press-fitted into bores formed in the panel 16 and in the frame 12. The panel 16 is turnable about the shafts 22 that are transverse to the upright direction between a first cutting position and a second cutting position. Preferably, the first and second cutting positions are angularly spaced apart by 180 degrees about the pivot axis 18. As shown by solid lines in FIG. 2, the upper panel surface 16A is coplanar, and generally continuous, with the upper frame surface 12A in the top board plane in the first cutting position, while the lower panel surface 16B is coplanar, and generally continuous, with the lower frame surface 12B in the bottom board plane in the same first cutting position. Thereupon, the panel 16 is turned and tilted, as shown by the phantom lines 16' in FIG. 2, until the panel 16 reaches the second cutting position, in which case, the lower panel surface 16B will be coplanar, and generally continuous, with the upper frame surface 12A in the top board plane in the second cutting position, while the upper panel surface 16A is coplanar, and generally continuous, with the lower frame surface 12B in the bottom board plane in the same second cutting position. In each cutting position, all the surfaces 12A, 12B, 16A, 16B are relatively smooth for ease of processing and for ease of resting on a countertop or like support surface. Optionally, all the surfaces 12A, 12B, 16A, 16B may be coated with a protective layer of resilient material, such as a thermoplastic.

Figure 3:
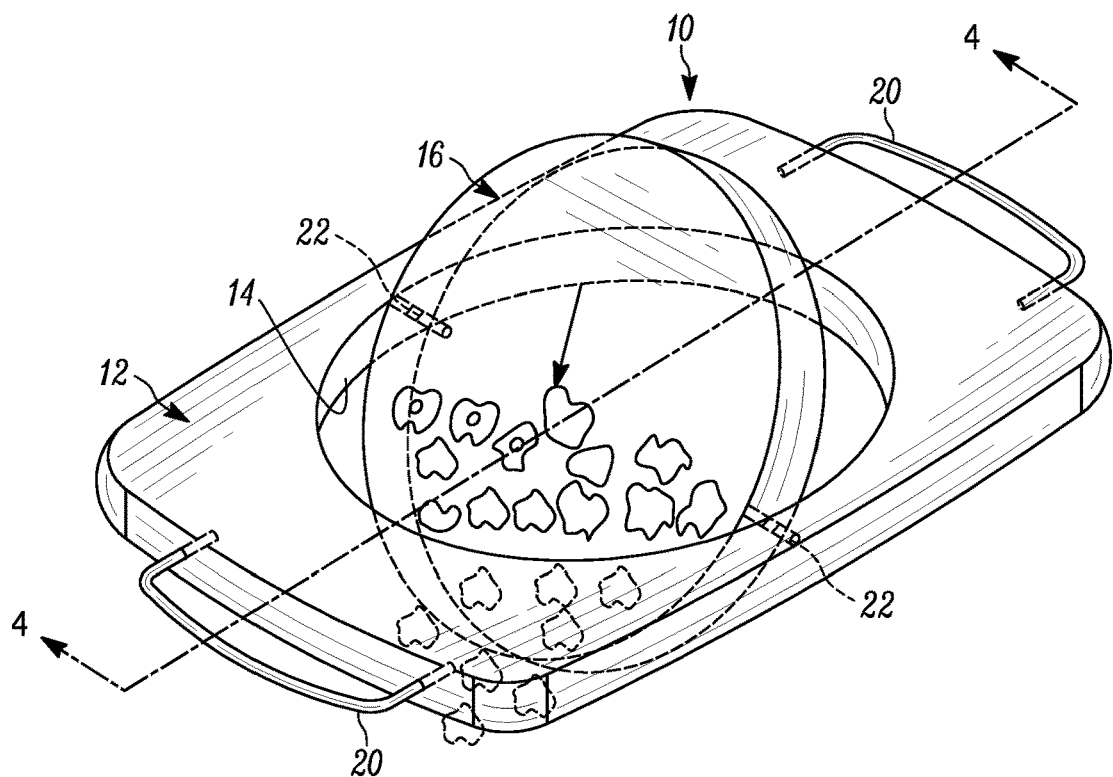
FIG. 3 is a perspective view of the cutting board of FIG. 1 in which the panel is tilted to depict removal of processed food therefrom.
Figure 4:
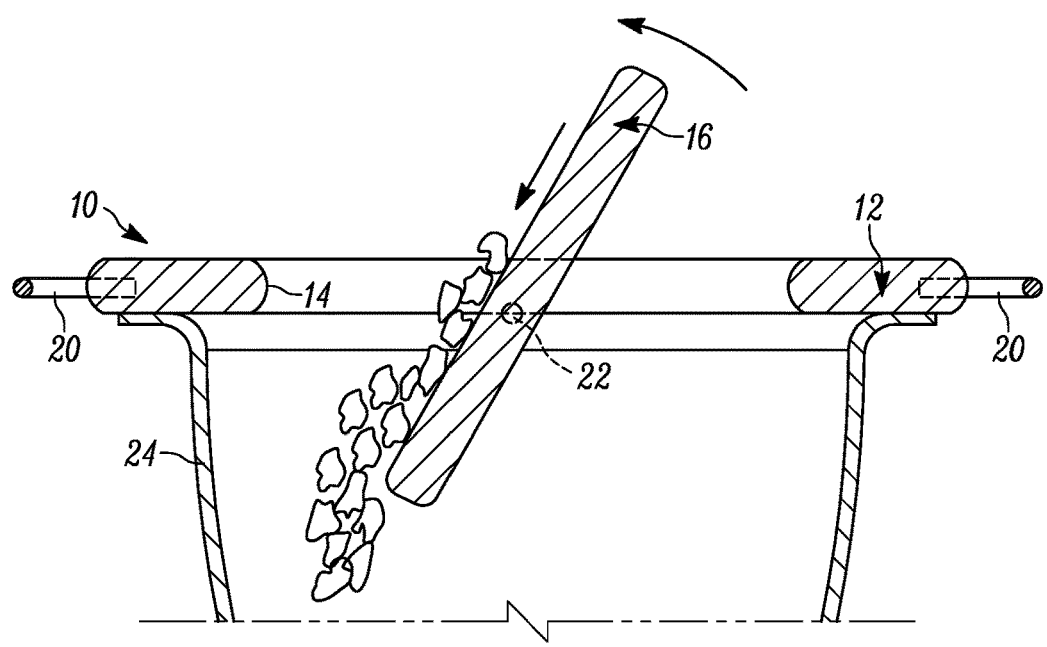
FIG. 4 is a sectional view taken on line 4-4 of FIG. 4 and depicting the removal of the processed food.

The reversibility of the panel 16 has many uses. For example, a food preparer can process one type of food in the first cutting position, and then quickly turn the panel 16 and process another type of food in the second cutting position. This can be performed while the board 10 is mounted on top of a kitchen vessel 24, as shown in FIGS. 3-4. As another example, the food preparer can easily remove either processed food into the kitchen vessel 24, or waste into a disposal bin, simply by tilting the panel 16 and scraping the processed food/waste off the board 10 in one motion, thereby minimizing the possibility that the processed food/waste will accidentally fall off the board and drop onto the floor. Tiling the board allows either surface thereof to be individually rinsed and cleaned.

Figure 5:
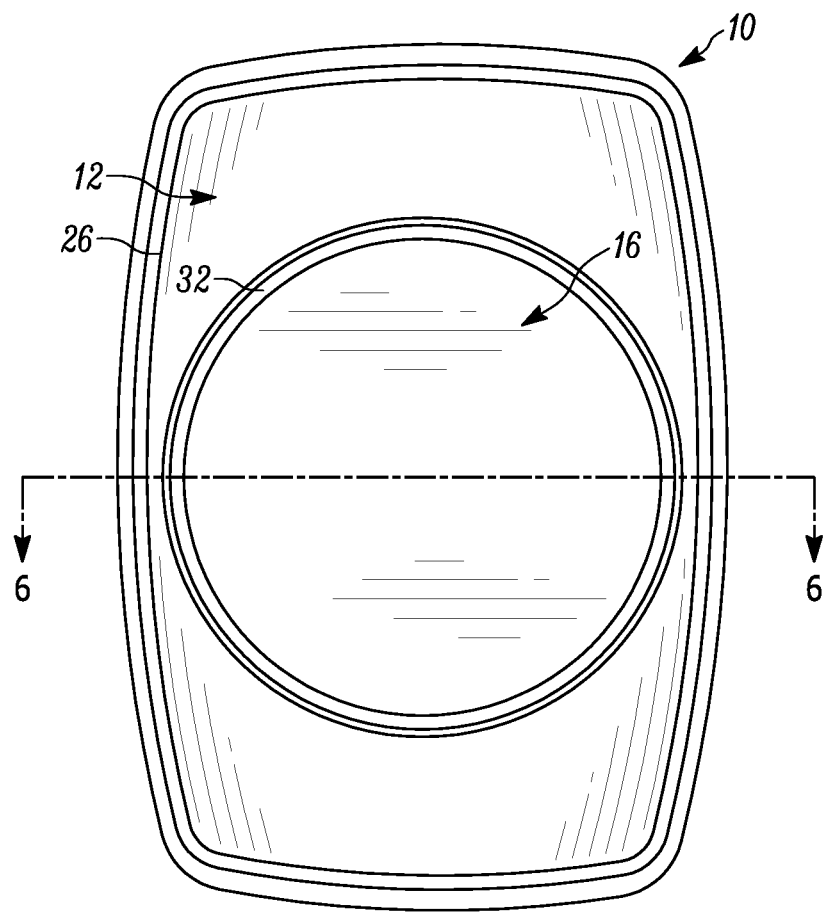
FIG. 5 is a top plan view of a cutting board in accordance with a preferred embodiment of this disclosure.
Figure 6:
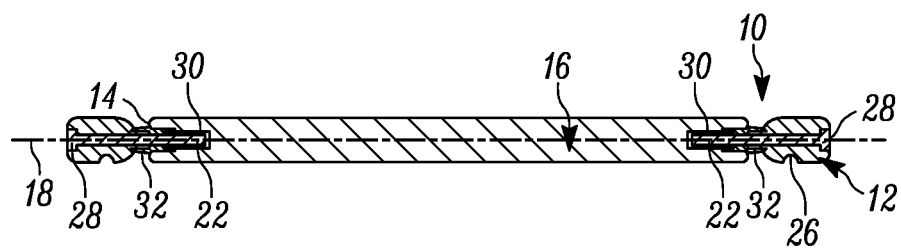
FIG. 6 is an enlarged, sectional view taken on line 6-6 of FIG. 5.

A preferred embodiment of the cutting board is depicted in FIGS. 5-6 in which like reference numerals have been used to identify like parts. In contrast to the embodiment of FIG. 1, the handles 20 have been omitted, and a juice groove 26 has been formed in the frame 12 to collect juice or like liquids from the processed food. In addition, the collinear shafts 22 extend to the exterior of the frame and are configured as portion of bolts having enlarged heads 28. A pair of bushings 30 is press-fitted into the panel 16, and the collinear shafts 22 extend into the bushings 30. In addition, an annular sleeve 32 is mounted between the frame 12 and the panel 16 in the opening 14. The sleeve 32 surrounds the panel 16. The sleeve 32 also surrounds the collinear shafts 22 and extends into the panel 16 to engage the bushings 30. The sleeve 32 also extends into the frame 12. The panel 16 is free to rotate about the axis 18.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, or contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A portable cutting board, comprising:
   a frame having
      a generally planar, upper frame surface lying in a top board plane,
      a generally planar, lower frame surface lying in a bottom board plane that is generally parallel to the top board plane, and
      an opening extending through the frame between the upper and lower frame surfaces along an upright direction that is generally perpendicular to the top and bottom board planes; and
   a reversible panel mounted within the frame with clearance in the opening for turning movement about a pivot axis that is transverse to the upright direction between a first cutting position and a second cutting position, the reversible panel having
      a generally planar, upper panel surface that is coplanar and continuous with the upper frame surface in the first cutting position, the upper panel surface also being coplanar and continuous with the lower frame surface in the second cutting position, and
      a generally planar, lower panel surface that is coplanar and continuous with the lower frame surface in the first cutting position, the lower panel surface also being coplanar and continuous with the upper frame surface in the second cutting position.

2. The cutting board of claim 1, and a pair of collinear shafts extending along the pivot axis in opposite directions away from the panel to the frame, and wherein the reversible panel is turnable about the shafts.

3. The cutting board of claim 1, wherein the first and second cutting positions are angularly spaced apart by 180 degrees about the pivot axis.

4. The cutting board of claim 1, wherein the reversible panel and the opening are of complementary contour.

5. The cutting board of claim 1, wherein the frame is elongated and extends between opposite end regions, and a pair of handles mounted at the end regions.

6. The cutting board of claim 1, wherein the reversible panel is movable between the first and second cutting positions in either circumferential direction about the pivot axis.

7. The cutting board of claim 1, wherein the reversible panel at least temporarily maintains each of the cutting positions by friction.

8. The cutting board of claim 1, wherein the frame and the reversible panel are constituted of lightweight materials to enable the board to be portable.

9. The cutting board of claim 1, wherein the frame has a groove for collecting liquids.

10. The cutting board of claim 1, wherein the frame and the reversible panel have the same thickness as considered along the upright direction.

* * * * *